G. H. SPAULDING,

Assignor to R. H. JONES.

Harvester.

No. 8,711. Reissued May 13, 1879.

Witnesses

W. C. Curlis

D. J. Moy

INVENTOR

George H. Spaulding

By Coburn & Thacher

Attorneys

N. PETERS, PHOTO-LITHOGRAPHER, WASHINGTON, D. C.

UNITED STATES PATENT OFFICE.

GEORGE H. SPAULDING, OF ROCKFORD, ILLINOIS, ASSIGNOR TO RICHARD H. JONES.

IMPROVEMENT IN HARVESTERS.

Specification forming part of Letters Patent No. 111,987, dated February 21, 1871; Reissue No. 8,711, dated May 13, 1879; application filed October 17, 1878.

*To all whom it may concern:*

Be it known that I, GEORGE H. SPAULDING, of Rockford, in the county of Winnebago and State of Illinois, have invented a certain new and useful Improvement in Harvesters, which is fully set forth in the following specification, reference being had to the accompanying drawings, in which—

Figure 1:
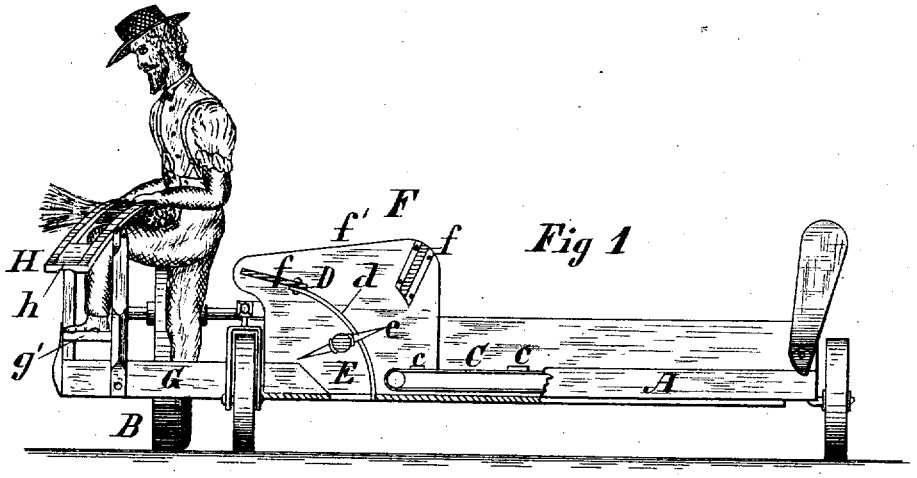
Figure 2:
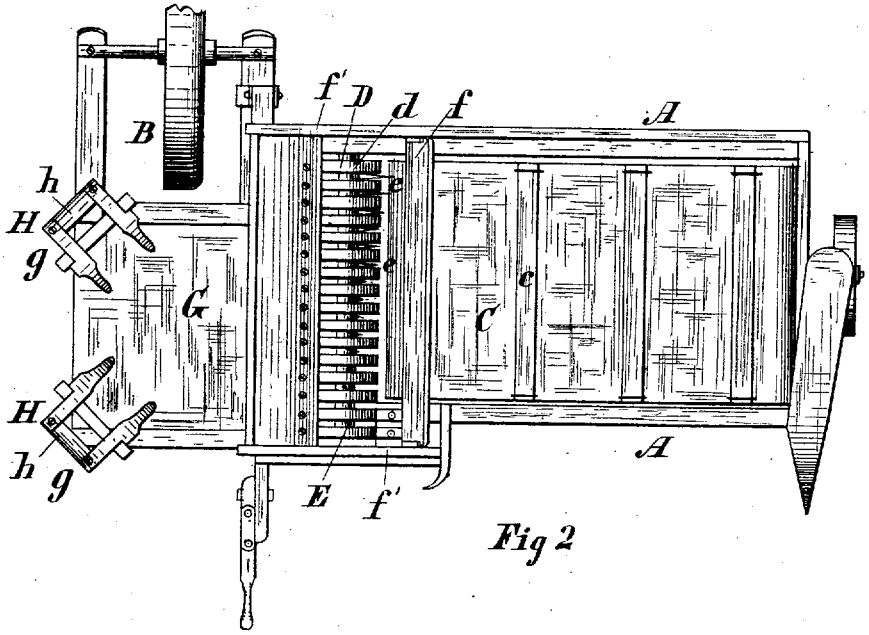

Figure 1 represents a front elevation of a harvester embodying my improvements, a portion at the inner end of the platform being broken away; and Fig. 2, a plan view of the same.

My present invention is intended as an improvement upon the harvester for which Letters Patent were granted to me December 17, 1867.

The invention relates to that class of machines in which the grain is bound on the machine; and the improvements relate more especially to the mechanism by means of which the grain is elevated from the platform to a suitable receiver, although they also include a novel device to facilitate the operation of binding.

The invention consists in the combination of a grain-receiver with a toothed shaft or cylinder, the rotation of which elevates the grain and delivers it into the bottom of the receiver.

It also consists in the combination of a slotted guard arranged around the toothed shaft with the revolving elevating-shaft and grain-receiver.

It also consists in special devices for compressing and holding the bundle while being bound, all of which will be hereinafter more fully set forth in the description, and specified in the claims.

My improvements are applicable to any ordinary harvester, and as the general construction of this machine is well known, it is not necessary to enter into a full and particular description thereof in connection with my improvements; hence only such parts of the machine are shown in the drawings as are necessary to clearly illustrate my present invention, and such only will be described.

In the drawings, A represents the supporting-frame of the harvester, and B the main wheel, on which the frame is mounted in the usual way. An endless apron, C, takes the place of the platform, and is provided with slats or ribs *c*. The grain falls upon this apron as it is cut, and is carried along upon it to the inner end of the platform. At the inner end of the apron is a curved slotted guard, D, which, as shown in the drawings, is composed of a series of bows, *d*, attached to suitable supports at their upper and lower ends, and separated a slight distance from each other.

Inside of this curved slotted guard is a revolving shaft or cylinder, E, which is provided with teeth *e*, arranged to project through the spaces or slots in the guard D. The teeth are also shown in the drawings arranged around the shaft spirally.

The grain-receptacle F is located just above the toothed shaft and slotted guard. It is composed of two side pieces, *f*, inclined toward each other, and separated at their lower edges, so as to leave an open space at the bottom of the receiver. These inclined side pieces are attached to suitable rigid supports *f'* at each end, and it will be noticed that in this instance the upper ends of the bows *d* are secured to the inner side piece *f*.

The binder's platform or foot-board G is arranged in front of the main wheel on the side of the grain-receiver, opposite to the platform.

Two pairs of posts, *g g*, are mounted on the foot-board at the outer corner thereof, which are connected at their lower ends by a bar, *g'*, for the accommodation of the binder's foot. Between the upper ends of each pair of posts is pivoted a compressing-finger, H, constructed with rear extension, *h*, which is inclined downward, and arranged so that when the binder's foot is placed upon the lower bar, *g'*, his knee will strike the extension and tilt the fingers so that they will press down upon the bundle of grain laid across his knee.

It will be seen that I do not use a table or other support for the bundle, but the latter rests on the binder's knee or leg, and is held in position by the fingers H while it is bound.

The grain-receiver, toothed shaft, slotted guard, and platform-apron are relatively arranged so that as the grain is delivered at the inner end of the apron it is caught by the teeth on the revolving shaft, which are projected through the slots in the guard at the lower edge of the latter as the shaft is revolved. The grain is carried up by the teeth as the shaft is rotated, and is discharged into the receiver through the opening in the bottom thereof, the teeth of the elevating-shaft being long enough to force the grain up through this opening before they are withdrawn from the slots at the upper edge of the guard by the continued revolution of the shaft. This elevating device is exceedingly cheap and simple, and is especially adapted to use with a receiver in which the grain is delivered through an opening in the bottom.

The slotted guard and elevating-shaft are made somewhat longer than the width of the platform-apron, so that they project forward of the front edge of the latter, as shown in Fig. 2 of the drawings. One or two teeth of the elevating-shaft will therefore be in advance of the front edge of the apron, and will catch the butts of the grain, thereby preventing all lagging, so that the grain will be elevated evenly.

The device for binding obviates the necessity of tables, and relieves the hands and arms to a great extent from the strain of tightening the band to compress the bundle, which in the ordinary table is accomplished entirely by the strain on the band.

The precise construction and arrangement of the devices herein shown and described may be modified without essentially changing the principle and operation of my invention.

Having thus described my invention, what I claim as new, and desire to secure by Letters Patent, is—

1. A grain-receiver adapted to receive the grain at the bottom or base, in combination with a revolving toothed elevating-shaft arranged to elevate the grain from the platform and discharge it into the bottom of the receiver, substantially as described.

2. An open-bottomed grain-receiver, in combination with a revolving toothed elevating-shaft and a curved slotted guard, substantially tially as described.

3. An open-bottomed grain-receiver, in combination with a revolving toothed elevating-shaft, and a platform delivery mechanism operating to deliver the cut grain to the elevating-shaft in a substantially continuous stream, substantially as described.

4. The pivoted compressing-fingers, constructed as specified, and adapted to be operated by the knee of the binder, substantially as described.

GEORGE H. SPAULDING.

Witnesses:
JNO. C. MACGREGOR,
W. C. CORLIES.